United States Patent
Weber et al.

(10) Patent No.: US 6,784,380 B2
(45) Date of Patent: Aug. 31, 2004

(54) SAMPLE CHANGER FOR A BALANCE

(75) Inventors: René Weber, Oetwil an See (CH); Bruno Nufer, Illnau (CH); Pascal Desponds, Winterthur (CH); Roland Nater, Winterthur (CH)

(73) Assignee: Mettler-Toledo GmbH, Greifensee (CH)

( * ) Notice: Subject to any disclaimer, the term of this patent is extended or adjusted under 35 U.S.C. 154(b) by 104 days.

(21) Appl. No.: 10/295,931

(22) Filed: Nov. 15, 2002

(65) Prior Publication Data

US 2003/0098183 A1 May 29, 2003

(30) Foreign Application Priority Data

Nov. 28, 2001 (DE) .......................................... 101 58 179

(51) Int. Cl.[7] .............................................. G01G 23/01
(52) U.S. Cl. ...................... 177/145; 177/180; 177/181; 177/238
(58) Field of Search ................................. 177/145, 180, 177/181, 238–243

(56) References Cited

U.S. PATENT DOCUMENTS

| | | | | |
|---|---|---|---|---|
| 5,064,009 A | * | 11/1991 | Melcher et al. | 177/245 |
| 5,115,876 A | * | 5/1992 | Chang et al. | 177/145 |
| 5,193,630 A | * | 3/1993 | Cane | 177/50 |
| 6,150,618 A | * | 11/2000 | Chou | 177/145 |
| 6,420,666 B1 | * | 7/2002 | Baumeler et al. | 177/145 |
| 6,603,081 B2 | * | 8/2003 | Luchinger | 177/126 |

FOREIGN PATENT DOCUMENTS

| | | | | |
|---|---|---|---|---|
| DE | 3814959 | | 11/1989 | |
| JP | 2003-194622 A | * | 7/2003 | G01G/21/22 |

* cited by examiner

Primary Examiner—Randy W. Gibson
(74) Attorney, Agent, or Firm—Friedrich Kueffner

(57) ABSTRACT

A sample changer for a balance (1) with a weighing pan (18) has at least two sample carriers (3) that are spaced apart from each other. Each sample carrier is configured to receive at least one weighing-object unit and transport the weighing-object unit to the weighing pan (18). An individual draft-shield element (4) consisting at least in part of a transparent material is arranged above each of the sample carriers (3), closing off a sample space laterally and from above.

16 Claims, 4 Drawing Sheets

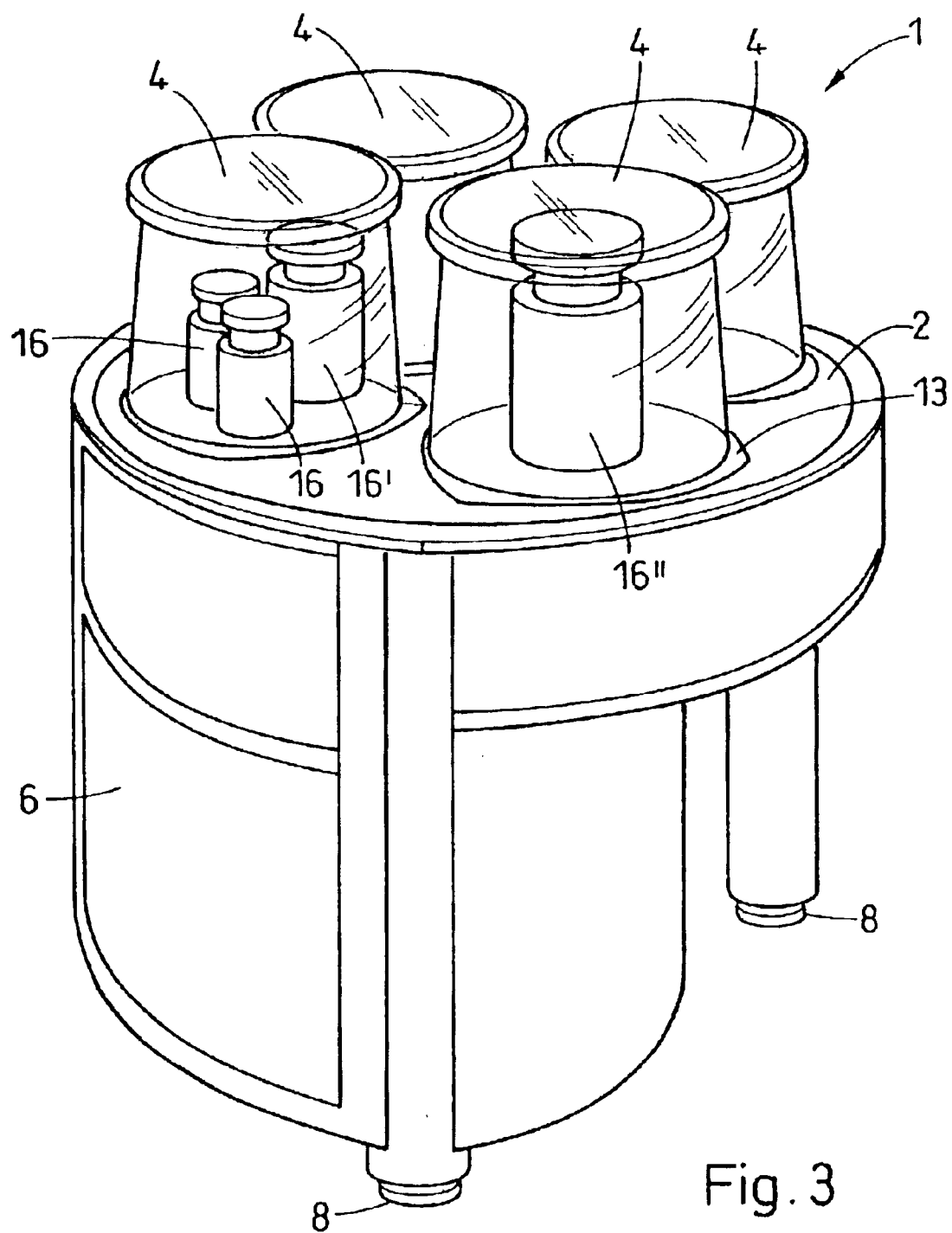

SAMPLE CHANGER FOR A BALANCE

BACKGROUND OF THE INVENTION

The invention relates to a sample changer for a balance, in particular for a comparator balance. The sample changer serves to transport the weighing objects to a weighing pan and has at least two sample carriers to hold the objects to be weighed. The sample carriers are arranged at a distance from each other on the sample changer.

A sample changer for a comparator balance is disclosed in DE-U-295 17 368. The sample changer described there serves to consecutively transport the samples, which in this particular case are test weights, to a weighing pan and to subsequently remove the samples from the weighing pan. The weighing object is placed on a receiver stage that is perforated by slots and can be lowered and lifted in relation to the weighing pan. The weighing pan has an arrangement of vertically upstanding ridges that pass through the slots of the receiver stage when the latter is lowered and lifted. The weighing pan with the arrangement of ridges consists of at least four branches that are joined by a connecting ridge. With a comparator balance of this design, it is possible to also weigh several weights of different sizes together with the highest degree of accuracy.

Comparator balances are used to make accurate measurements of the mass and volume of weight pieces. Their application is primarily in governmental institutes of metrology. When making comparison weighings, it is often necessary to handle test weights in a diversity of different sizes. A principal requirement for these kinds of balances is that they have to be capable of making very accurate weight measurements. It is therefore important that the weights under test not be exposed to changes in the ambient conditions, in particular to air drafts, during a weighing process.

A sample-handling device for analytical applications, which by means of a gripping device transports the sample under analysis to a balance and subsequently transfers the sample from the balance to an analytical instrument, is described in DE-A-38 27 293. To avoid the problem of air drafts, the weighing takes place in an enclosed space that has to be opened to place the sample on the weighing pan and to subsequently take the sample out again.

The last-mentioned among the devices known under the existing state of the art has the disadvantage, that the samples are exposed to the ambient atmosphere during the times when they are being transported to or from the balance pan and that they could therefore have a temperature that is different from the enclosed space above the weighing pan. This risk exists in particular in a case where the sample has to be transported over relatively large distances to reach the weighing pan. For weighings of the highest precision, it could become necessary to allow an acclimating period before the actual weighing, but this is a time-consuming measure.

OBJECT OF THE INVENTION

It is therefore the object of the present invention to propose a sample changer which, in cooperation with a balance, provides the most stable environment possible for the weighing objects, in particular with regard to avoiding air currents and keeping the temperature constant, and which thereby creates conditions conducive to accurate weighing.

SUMMARY OF THE INVENTION

According to the present invention, a sample changer for a balance with a weighing pan has at least two sample carriers arranged at a distance from each other and designed so that each of the sample carriers can support at least one unit of the objects to be weighed and transport the weighing-object unit to the weighing pan. An individual draft-shield element, made at least in part of a transparent material, is provided for each of the sample carriers, enclosing the top and the sides of a sample space.

With the sample changer according to the invention, it is not necessary to open the draft-shield when transporting a new sample to the weighing pan, as the sample changer brings the weighing objects directly to the weighing pan without taking them out of the sample space that is surrounded by the draft shield, so that the weighing objects don't have to leave the environmental conditions that are favorable for weighing. Rather, each of the sample carriers together with its own draft-shield element is movable in relation to the weighing pan to bring the at least one weighing object into a weighing position. This arrangement also assures a stable temperature for the weighing-object units that are enclosed in the sample space.

In a preferred embodiment, the sample changer has a platform to which at least two sample carriers can be attached by means of a releasable connection. To transport the at least one weighing object to the weighing pan, the platform is movable in relation to the weighing pan.

When a sample carrier is in the weighing position, the weighing pan will be located inside the sample space enclosed by the draft-shield element that belongs to that sample carrier. To transfer the weighing-object units to the weighing pan, the platform and/or the sample carrier are movable up and down in relation to the weighing pan.

In an advantageous embodiment of the invention, a draft-shield element is configured essentially as a hollow body consisting in particular of glass. The draft-shield element has a seating rim. To define a stable position of the draft-shield element on the sample changer, the seating rim of the draft-shield element sits in a matching seating recess of the sample changer. Both the seating rim and the seating recess can be of a polygonal shape, with the seating rim fitting the shape of the seating recess of the sample changer.

In a particularly advantageous development of the invention, each of the draft-shield elements has a gripping device by which the draft-shield device can be handled, in particular for putting the draft-shield device on and off the sample changer.

Holders for sensors are installed in recesses of the platform of the sample changer and extend into the sample spaces. The purpose of the sensors is to measure environmental parameters, e.g., temperature or humidity, for the weighing-object units inside the sample space.

In a particularly preferred embodiment according to the invention, the sample carrier is configured as a grating. In the weighing position of the sample carrier, a weighing pan with upstanding ridges reaches through the grating. In an advantageous version of the invention, the sample changer may have a circular platform that is rotatable about its center point and has four receiving positions arranged at 90° from each other for the sample carriers. This arrangement is particularly advantageous for a comparator balance.

BRIEF DESCRIPTION OF THE DRAWINGS

Details of the sample changer according to the invention as well as the ways in which it cooperates with a balance may be learned from the following description of an example of a comparator balance that is shown in the drawings, wherein:

FIG. 3 illustrates a comparator balance with a sample changer in a perspective representation, seen from a viewing position rotated by about 90° in relation to the viewing position of FIG. 1;

DETAILED DESCRIPTION OF PREFERRED EMBODIMENTS

Figure 1:
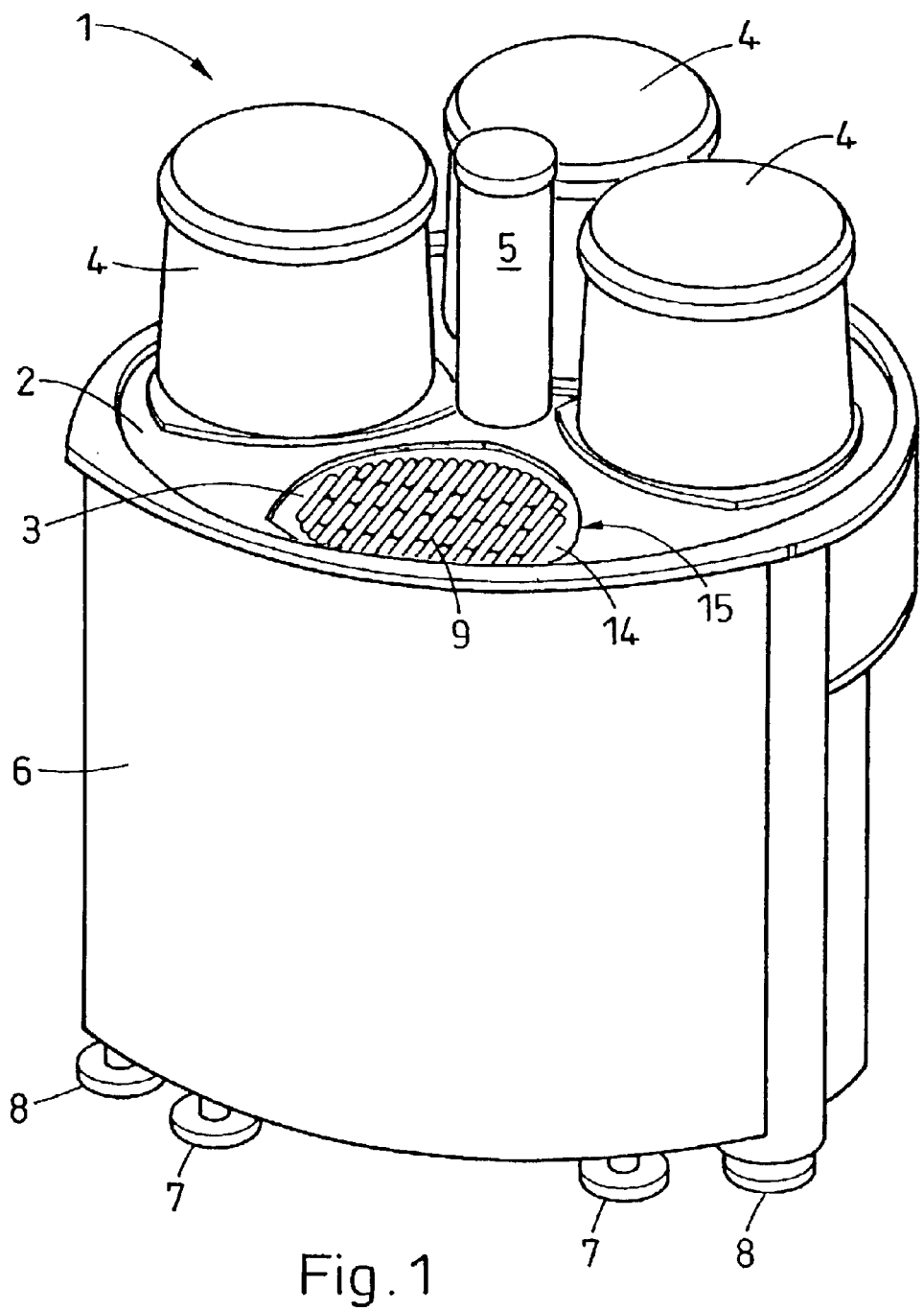
FIG. 1 illustrates a comparator balance with a sample changer in a perspective representation seen at a downward viewing angle.

FIG. 1 shows an overall view of a comparator balance 1 with a sample changer in a three-dimensional view, as seen at a downward-directed viewing angle. The sample changer has a circular platform 2 with four sample carriers 3 for the weighing-object units which are arranged in four different positions at 90° from each other. In FIG. 1, only the sample carrier 3 in front, closest to the viewer, can be seen. It consists of a flat grating 9 that is bordered by a frame 14 of, e.g., a polygonal shape. The sample carrier 3 sits in a seating recess 15 of the platform 2 and has a releasable connection to the latter. In each of the other three positions of the sample changer, the respective sample carriers 3 are covered by frusto-conical hollow bodies. Each of the hollow bodies serves as a draft-shield element 4 for the respective sample carrier 3 and protects the weighing object on the sample carrier from detrimental effects of the ambient environment.

The weighing-object units that are placed on each of the sample carriers 3 can be for example test weights of different sizes, as is often the case in applications where comparator balances are used. It is also possible that one or more test weights are put simultaneously on one of the sample carriers 3 (as shown in FIG. 3).

The sample changer turns in a horizontal plane, with the center of rotation being located at the center of the circular platform 2, inside the cylinder 5. The rotation of the platform 2 serves to transport the weighing-object units on the sample carriers 3 to the weighing pan. At the same time, the platform 2 is designed so that it can be raised and lowered. The sample carrier 3 at the position of the weighing pan can thus be moved downwards to a position where the top surface of the sample carrier is below the top of the weighing pan, so that the latter reaches through the sample carrier, whereby the weighing-object units are transferred from the sample carrier to the weighing pan (see also FIG. 4). In this state of the apparatus, the draft-shield element 4 covers both the sample carrier 3 as well as the weighing pan and gives continuous protection to the weighing-object units also during the weighing process against conditions such as, e.g., air drafts. At the same time, the transfer of the weighing-object units from the sample carrier 3 to the weighing pan and vice versa can be observed from the outside, as the draft-shield elements 4 are preferably made of glass. This is particularly advantageous in case of a possible malfunction in the transfer, where the weighing objects could shift their positions, because it allows corrective measures or even an intervention from the outside to be undertaken immediately.

The lower portion of the comparator balance 1, which in FIG. 1 is hidden behind an enclosure panel 6, holds the weighing unit and a set of mechanically actuated weights for the mechanical equilibration of the comparator balance 1. The comparator balance 1 with the sample changer on the one hand, as well as the weighing unit on the other hand, are each supported by three feet 7, 8 (only two of which are visible), which are height-adjustable for the purpose of setting up the apparatus in a level position.

Figure 2:
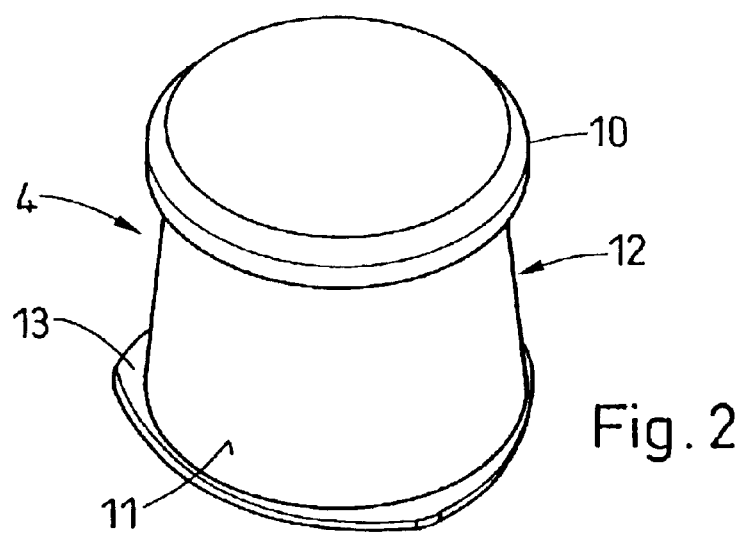
FIG. 2 illustrates a draft-shield element in a three-dimensional representation.

FIG. 2 shows one of the draft-shield elements in a three-dimensional representation. It is preferably designed as one integral hollow body 12 that is made of glass. In the illustrated embodiment, the draft-shield element 4 has the shape of a truncated cone with a nearly cylindrical circumference 11. The top of the circumference 11 has a gripping device, e.g. in the form of a protruding border 10 to provide a better grip for lifting the draft-shield element from its seat. The protruding border 10 can either be grasped with both hands in order to lift the draft-shield element 4 and to put it back on the platform 2, or it can be held at the protruding border 10 with the help of a gripper arm or a hoisting device.

At the bottom edge of the draft-shield element 4, a polygon-shaped seating rim 13 is firmly attached to the hollow glass body 12. The seating rim 13 fits precisely into the seating recess 15 (see FIG. 1) of the platform 2 which has a matching shape, so that the draft-shield element 4 can be positively positioned directly on the sample carrier 3. Thus, the draft-shield element 4 is stabilized in its position and cannot become dislodged on the sample changer during the transport movement. Furthermore, as the draft-shield element has a relatively large mass, being made predominantly of glass, the desired stable conditions in regard to a constant temperature or absence of air drafts can be achieved in the sample space, i.e., in the space above the sample carrier 3 that is enclosed by the draft-shield element 4. At the same time, the arrangement allows an unobstructed view of the sample.

FIG. 3 gives an overall view of the comparator balance with the sample changer, likewise in a three-dimensional representation, but from a viewing position that is rotated by about 90° in relation to FIG. 1. Each of the four sample carriers 3 is covered by a draft-shield element 4. The form of illustration in FIG. 3 was chosen to emphasize the advantage offered by a transparent draft-shield element according to the invention. Due to the fact that the draft-shield element consists primarily of glass, it is possible to closely observe the weighing objects, in this case the test weights 16, 16', 16" of different sizes and denominations as they are being transported to the weighing pan. The ability to observe the weights is important, because on a sample carrier 3 carrying several weights 16, 16', 16", the weights could become dislodged during the rotation of the platform 2 so that they could touch each other and, in the worst case, suffer damage from rubbing against each other, whereby their polished surfaces could be scratched. It is also desirable to be able to observe and verify that individual test weights 16" or groups of test weights 16, 16' are transferred correctly to the weighing pan (which is not visible in FIG. 3) by the vertical downward movement of the platform 2. Thus, the transparency of the draft-shield elements 4 allows the entire weighing process to be monitored.

Figure 4:
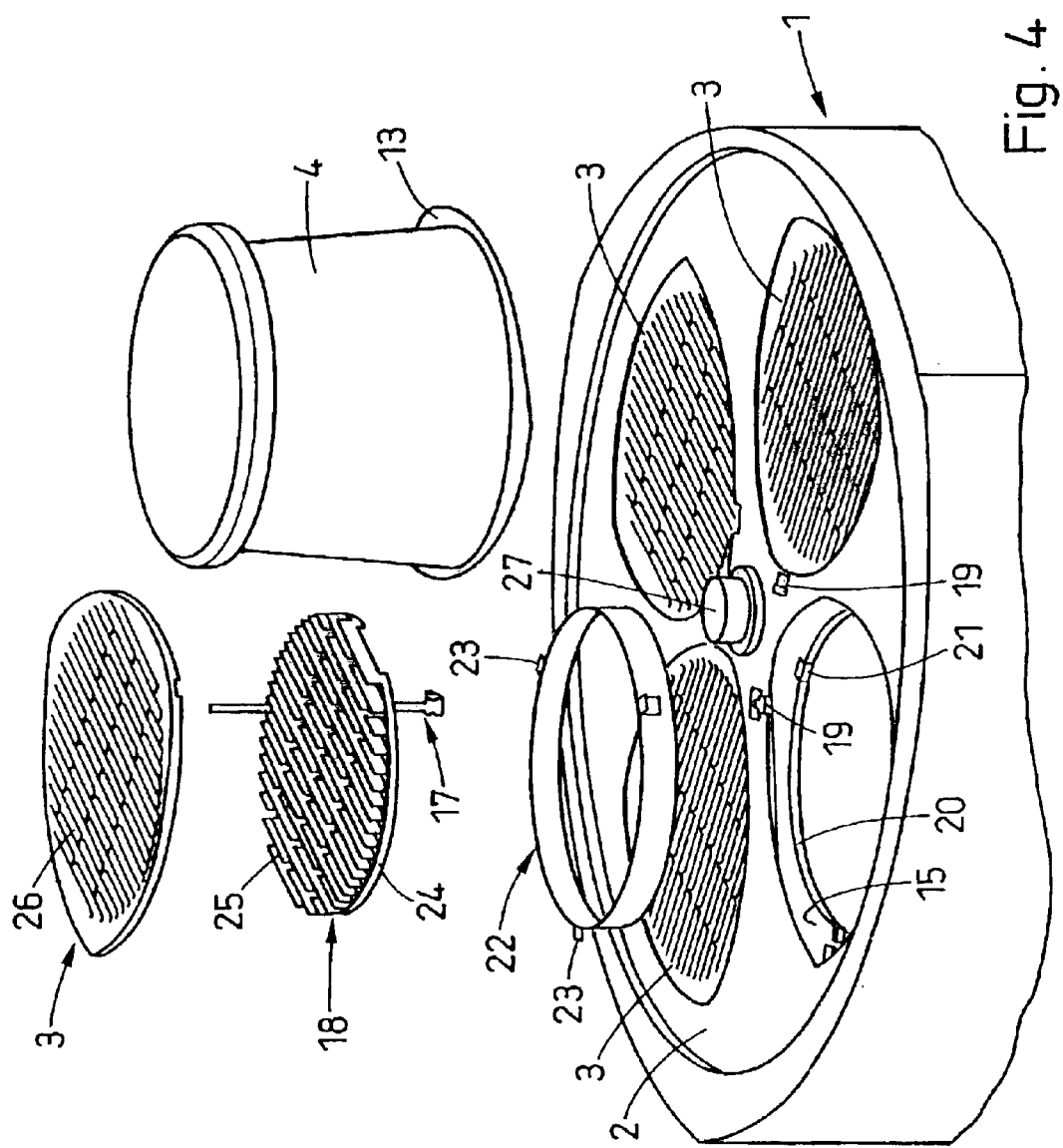
FIG. 4 shows a perspective representation of the upper part of the comparator balance with the sample changer in an exploded three-dimensional view.

In FIG. 4, the upper part of a balance 1 with a sample changer is shown in a three-dimensional view with the parts separated from each other in the manner of an exploded view. Each of the sample carriers 3 is attached in three places to the respective seating recess 15 of the platform 2. For the sample carrier in FIG. 4 that is closest to the viewer, the components of the arrangement are shown separated from each other. This is the location where the weighing cell is arranged which is not visible in the illustration because it is located at a lower level within the balance 1 and surrounded by a protective enclosure. The weighing pan 18 is connected to the weighing cell through a rod mechanism (likewise not shown in the drawing), through which the weighing load is transmitted. The weighing pan 18 has a structure of upstanding ridges on a disk-shaped base 24. In the weighing position of the weighing pan 18, the ridges 25 reach through the slots 26 of the grid-shaped sample carrier 3 and thereby lift the weighing objects off the sample carrier 3 so that they can be weighed. A ledge 20 around the bottom border of the seating recess 15 has three attachment locations 21 for the installation of a cylindrical shield 22, where the latter has three matching attachment tabs 23. The shield 22 protects the weighing pan 18 from drafts in the area below the draft-shield element 4 and thus works together with the draft-shield element 4.

Also shown in FIG. 4 is a holder 17 for sensors that can be arranged in the sample space. An identical holder can be installed in each receiver position of the sample changer by attaching the holder to one of the cutouts 19 of the platform 2 above the top surface of a sample carrier that has been set in place. In the installed condition, the holder 17 protrudes into the sample space, but the weighing pan 18 and the holder 17 cannot be allowed to touch each other in the weighing position of the weighing pan 18. The electrical connecting lines to the sensors are led to the outside through the cutouts 19 and collected in the cylinder 5 (see FIG. 1). FIG. 4 only shows the cylinder socket 27 on which the cylinder 5 can be mounted. With the arrangement of the sensors in the sample space, it is possible to measure, e.g., the temperature, the humidity or other parameters that can have an influence on a highly precise weighing. Since the draft-shield elements 4 (only one of which is shown in FIG. 4, for the sake of clarity) are transparent, the inventive arrangement has the advantage that the sensors that are installed on the holders 17 in each of the sample spaces can be checked, or that readings can be taken from the sensors if they are equipped with an indicating device. The last-mentioned possibility would be of particular interest in an application where the weighing objects on the balance 1 are samples of substances in which a change, e.g., a chemical reaction, needs to be observed as a function of time, and the experiment includes weighing the sample at regular time intervals.

Figure 5:
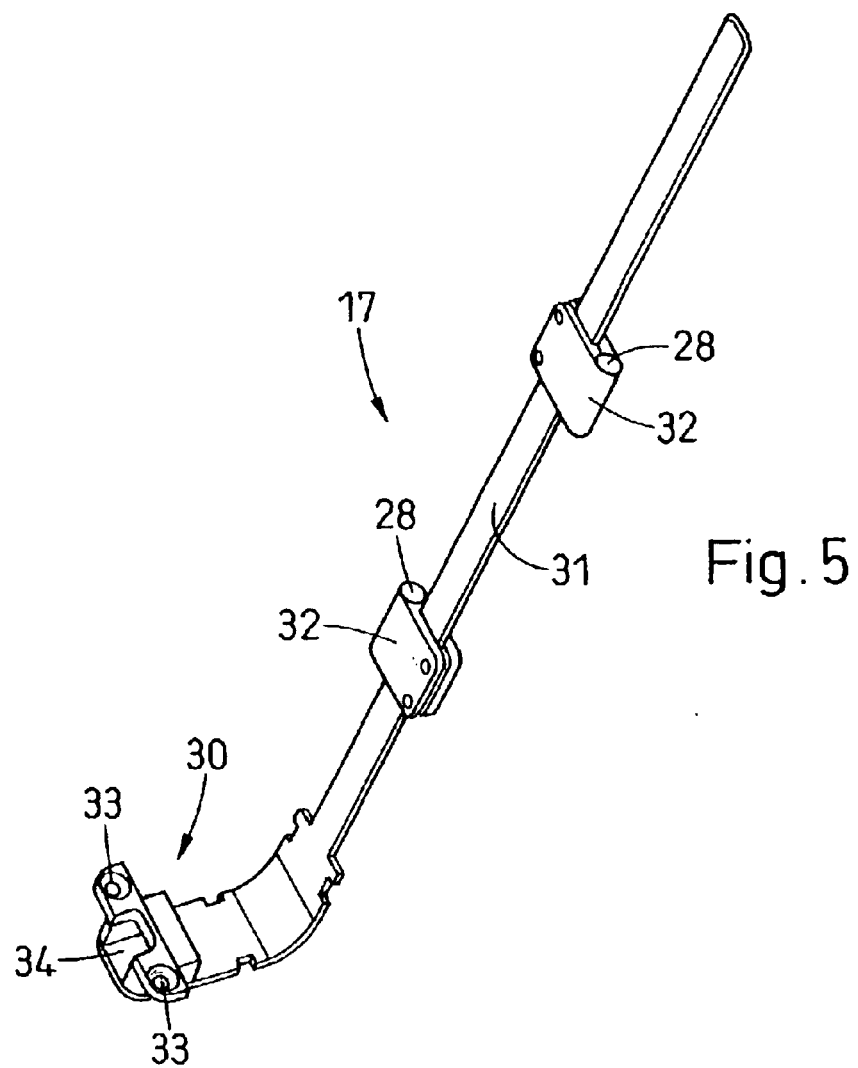
FIG. 5 shows a holder for one or more sensors in a three-dimensional view.

FIG. 5 illustrates a holder 17 for sensors. At its lower end, the holder has an attachment foot 30 with two screw holes 33 to fasten the foot in an approximately horizontal position in a cutout 19 (see FIG. 4). The conductor leads for the sensors are taken through a cutout 34 of the attachment foot 30. Bent upward from the foot at an angle of about 90° is a vertical stem 31. Several sleeves 32 can be attached to the stem 31 to hold sensors, e.g., in the openings 28. Thus, after the holder 17 has been installed, the sensors can be arranged at an arbitrarily selected height inside the sample space.

The draft-shield elements according to the invention can also be of such a shape and can be arranged on the sample changer of a balance in such a manner that they not only close off the space vertically above a sample carrier but also cover an area extending laterally from the sample carrier and/or the weighing pan. This arrangement would be appropriate in particular if weighing objects are to be transported that protrude laterally beyond the area of the sample carrier.

List of Reference Symbols
1 balance, comparator balance
2 platform
3 sample carrier
4 draft shield element
5 cylinder
6 enclosure panel
7 feet
8 feet
9 grating
10 gripping device, protruding border
11 circumference
12 hollow glass body
13 seating rim
14 frame
15 seating recess
16, 16', 16" test weights
17 holder
18 weighing pan
19 cutout
20 ledge
21 attachment location
22 shield
23 attachment tabs
24 disk-shaped base
25 upstanding ridges
26 slots
27 cylinder socket
28 opening
30 attachment foot
31 stem
32 sleeve
33 screw holes
34 cutout

What is claimed is:

1. A sample changer for a balance (1) with a weighing pan (18), wherein the sample changer comprises at least two sample carriers (3) that are spaced apart from each other, each sample carrier being operable to receive at least one weighing-object unit and to transport said weighing-object unit to the weighing pan (18), wherein the sample changer further comprises for each of the sample carriers (3) an individual draft-shield element (4) that is made at least in part of a transparent material and can be placed over the sample carrier (3) to close off a sample space laterally and from above.

2. The sample changer according to claim 1, wherein each of the sample carriers (3) together with a draft-shield unit (4) placed on the sample carrier (3) is movable in relation to the weighing pan (18) to transport the at least one weighing-object unit into a weighing position.

3. The sample changer according to claim 2, wherein the sample changer comprises a platform (2) to which the at least two sample carriers (3) are attached by means of a releasable connection.

4. The sample changer according to claim 3, wherein the platform (2) is movable relative to the weighing pan (18) for transporting the at least one weighing-object unit to the weighing pan (18).

5. The sample changer according to claim 2, wherein, when one of the sample carriers (3) is in the weighing position, the weighing pan (18) is enclosed in the sample space inside the draft-shield element that covers said one of the sample carriers.

6. The sample changer according to claim 4, wherein at least one of the platform (2) and the sample carrier (3) is movable up and down in relation to the weighing pan (18) for transferring the weighing-object units to the weighing pan (18).

7. The sample changer according to claim 1, wherein the draft-shield element (4) substantially comprises an integral hollow body (12).

8. The sample changer according to claim 1, wherein each of the draft-shield elements (4) comprises a seating rim (13) and the sample changer comprises seating recesses (15) of a shape matching the seating rims (13), so that the seating rims (13) can be seated in the seating recesses (15) to ensure a stable positioning of the draft-shield elements (4) on the sample changer.

9. The sample changer according to claim 8, wherein the seating rims (13) and the seating recesses (15) are of a polygonal shape, with the seating rims (13) fitting into the seating recesses (15).

10. The sample changer according to claim 1, wherein the transparent material is glass.

11. The sample changer according to claim 1, wherein each of the draft-shield elements (4) comprises a gripping device (10) to facilitate handling of the draft-shield elements.

12. The sample changer according to claim 1, further comprising at least one holder (17) for sensors, wherein the sample changer and the holder are configured so that the at least one holder (17) can be installed in a position where the holder (17) stands out into one of the sample spaces.

13. The sample changer according to claim 12, wherein the platform (2) has at least one cutout (19) for installing the holder (17).

14. The sample changer according to claim 1, wherein the sample carrier (3) comprises a grating (9) and the weighing pan (18) comprises upstanding ridges so that, when the sample carrier (3) is in the weighing position, the upstanding ridges (18) reach through the grating.

15. The sample changer according to claim 1, wherein the sample changer comprises a circular platform (2) that is rotatable about its center point and has four receiving positions arranged at 90° angles from each other for the sample carriers (3).

16. The sample changer according to claim 1, wherein the balance is a comparator balance.

\* \* \* \* \*